United States Patent [19]

Aldridge

[11] Patent Number: 4,465,448
[45] Date of Patent: Aug. 14, 1984

[54] APPARATUS FOR MAKING SHOES
[75] Inventor: John E. Aldridge, Norwich, N.Y.
[73] Assignee: Norwich Shoe Co., Inc., Norwich, N.Y.
[21] Appl. No.: 360,053
[22] Filed: Mar. 19, 1982
[51] Int. Cl.³ .......................... B29F 1/14; B29F 1/022
[52] U.S. Cl. ...................................... 425/119; 12/33.2; 425/129 S; 425/174.4; 425/441; 425/444; 425/576
[58] Field of Search ............... 264/237, 244, 336, 348, 264/25; 425/129 S, 444, 576, 174.4, 119, 441; 12/33.2

[56] References Cited
U.S. PATENT DOCUMENTS

| | | | |
|---|---|---|---|
| 2,305,433 | 12/1942 | Kyle | 264/348 |
| 3,085,294 | 4/1963 | Rosenbaum | 264/244 |
| 3,358,333 | 12/1967 | Kitchener et al. | 425/119 |
| 3,441,643 | 4/1969 | Tusa et al. | 264/244 |
| 3,555,609 | 1/1971 | Chu et al. | 264/244 |
| 3,588,958 | 6/1971 | Metzger | 425/576 |
| 3,676,542 | 7/1972 | Maltby | 264/244 |
| 3,732,055 | 5/1973 | Hujik | 425/129 S |
| 3,761,562 | 9/1973 | Skelham | 264/348 |
| 3,865,912 | 2/1975 | Rosenkranz et al. | 264/25 |

FOREIGN PATENT DOCUMENTS

| | | | |
|---|---|---|---|
| 840593 | 7/1960 | United Kingdom | 425/119 |
| 1315159 | 11/1974 | United Kingdom | 264/244 |

Primary Examiner—Willard E. Hoag
Attorney, Agent, or Firm—Hubbell, Cohen, Stiefel & Gross

[57] ABSTRACT

A method and apparatus for making shoes of the type comprising an injection molded sole which is bonded to a marginal edge portion of a string lasting preferably made of a thermoplastic material. The lasting is held on a last. A radiant heater is automatically positioned below the lasting to preheat the marginal edge portion of the lasting until it is tacky, at about 150°-200° F., after which the heater is withdrawn and the last and the lasting are positioned at the top of a sole mold. Injection molding apparatus injects a molten thermoplastic sole material, such as polyvinyl chloride, at high temperatures of about 300°-380° F. into a sole cavity formed in the sole mold were the molten material bonds to the marginal edge portion of the lasting to form a completed shoe. The completed shoe is cooled by transferring it from the last which was employed during the molding operation to a cooling last separate from the machine. The completed shoe is rapidly cooled to down below 45° F. in less than three minutes. The steps of preheating the lasting prior to molding the sole, and keeping the completed shoe warm until after injection molding whereupon the shoe is removed from the last and rapidly cooled on a separate cooling last provides a secure bond of the lasting and the sole as well as maintaining the desired shape of the completed shoe.

26 Claims, 9 Drawing Figures

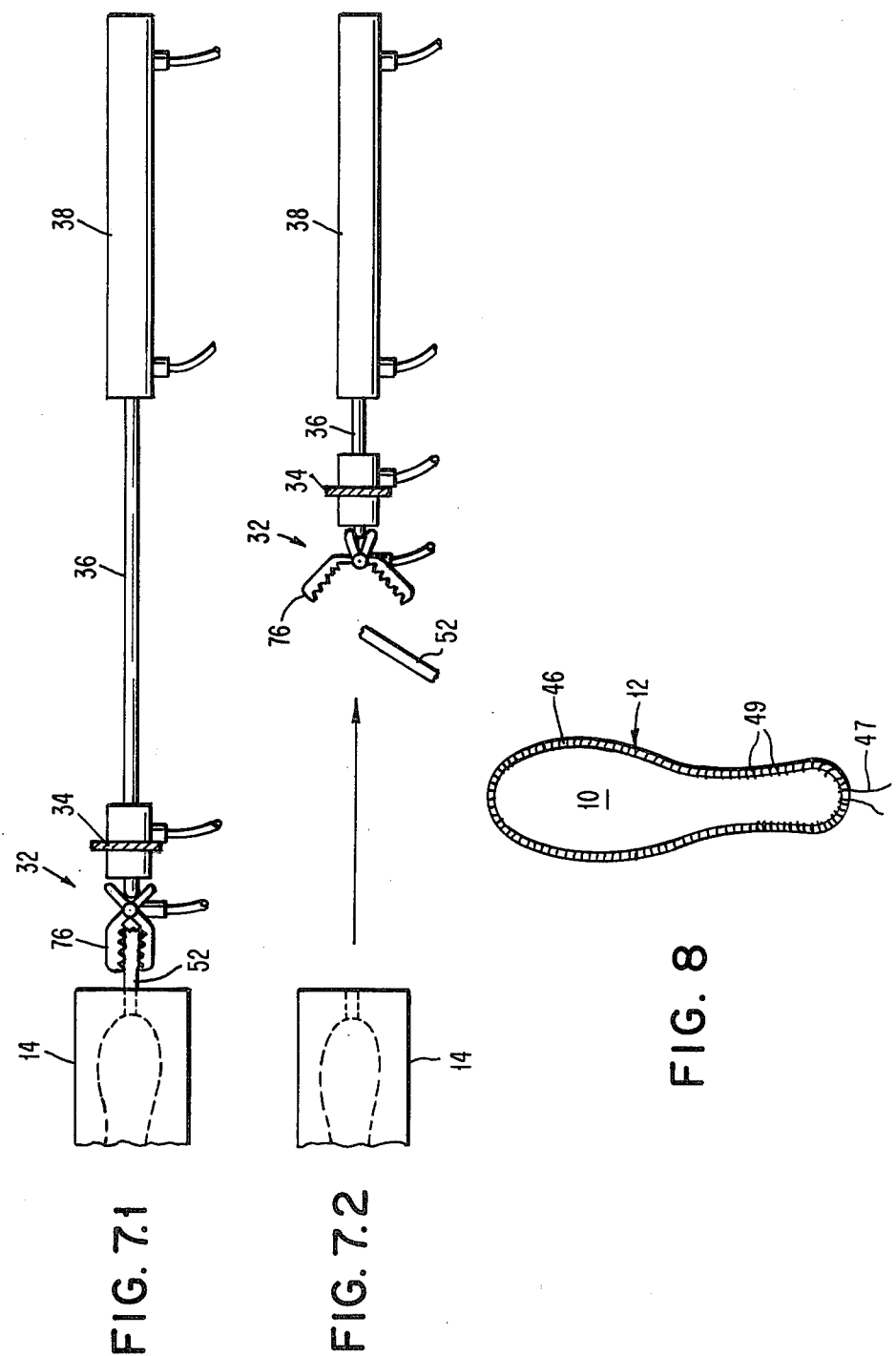
FIG. 7.1  FIG. 7.2  FIG. 8

APPARATUS FOR MAKING SHOES

TECHNICAL FIELD

The present invention relates to the manufacture of shoes, and more particularly to the manufacture of shoes using injection molding apparatus.

BACKGROUND ART

In one known type of injection molding apparatus for manufacturing shoes having shoe soles made, for example, of polyurethane, there is employed an upper mold consisting of a last for receiving a shoe shaft, a sole-heel mold longitudinally divided into side mold and a bottom stamp to form a hollow mold chamber. The raw materials for forming the shoe sole is fed into the hollow mold chamber by an injection apparatus which can be brought into association with the molds at various stations arranged around a rotatable table. An example of such an injection molding apparatus is disclosed in U.S. Pat. No. 4,286,936 to H. Hustedt.

In the U.S. Pat. No. 3,676,542 to F. V. Maltby, there is disclosed a method of manufacturing shoes having woven textile uppers wherein a last is formed with recesses extending along its bottom portion adjacent the peripheral part of the sole portion of the last. Electric heating elements are embedded in the recesses for heating the margin of the sole of the last so as to heat the adjacent canvas of the upper before contact by the molten thermoplastic material that is injected into the mold cavity. The peripheral sole portion of the last is heated in such manner to above the temperature which the textile upper would reach by the natural transfer of heat by an injection molding operation. During such heating of the peripheral part of the sole portion of the last, the patent describes that the middle part remains at a lower temperature. The patent states that the heating step provides good penetration of the canvas of the textile upper by the thermoplastic material and satisfactory adhesion between the upper and the sole.

Also, in the U.S. Pat. No. 3,441,643 to Tusa et al, there is described a method of preheating the sole portion of a textile upper by a heating element embedded in the last to condition the textile component to penetration by hot thermoplastic material for adhesion between the plastic and the textile. In both the Maltby and Tusa et al injection molding systems, the heating elements are embedded in the last and thereby retain a significant amount of heat in the last even after the adhesion process between the sole and the textile upper. This is disadvantageous in that there is some loss of control over the heat supplied to the last and sole even after the preheating operation until the formed shoe is physically removed from the heated last. This also affects the rate of cooling of the completed shoe and may result in undesirable shoe formation.

U.S. Pat. No. 3,085,294 to F. Rosenbaum describes a method of securing a leather, fabric or plastic lasting to a sole made of a vulcanizable rubber compound where the rubber sole is pre-heated before the molding and vulcanization stage by radiant heating elements located on opposite sides of the rubber sole surface for causing the sole to soften to a moldable plastic condition. The patentee states that the purpose of such pre-heating of the rubber sole is to enable the lower rim of the lasting margin to be quickly and fully embedded in the rubber sole as required before vulcanization can take place to any large extent.

U.S. Pat. No. 3,555,609 to Chu et al describes an injection molding apparatus for making shoes wherein the sole mold is provided with a coolant fluid during the injection process, prior to the removal of the lasting in its completed shoe form from the last. While such cooling is said by the patentee to reduce production time, cooling in this manner during the injection process before the shoe is completely formed may result in undesirable shoe formation.

It is an object of the present invention to provide a method and apparatus for manufacturing shoes using an injection molding apparatus wherein the lasting is of the type comprising a thermoplastic layer and is securely bonded to the sole and heel. It is another object to provide a method and apparatus for manufacturing shoes in an efficient manner while maintaining control over the desired formation of the shoe. It is another object to manufacture shoes using injection molding apparatus wherein control of the shoe temperatures both prior to and after the injection molding operation forming the completed shoe provides secure bonding of the lasting with the sole as well as maintaining the desired shoe shape after the injection molding operation.

DISCLOSURE OF THE INVENTION

These and other objects are achieved by the present invention which provides a method and apparatus for making shoes with injection molding apparatus which casts the sole in a mold. An upper foot form, commonly known as a "last", holds the shoe upper, or "lasting" which preferably is made of a sheet of thermoplastic material such as PVC or its equivalent laminated to a cloth or fabric substrate. Preferably the lasting is of the well known string lasting type wherein a relatively flat lasting is manipulated into conformity with the last by pulling on a string extending about the marginal edge portion of the lasting to force the lasting marginal edge to contract about the bottom of the last. Heating means are automatically positioned below the lasting to preheat the lasting margin until it is tacky at about 150°–200° F., after which the heating means are withdrawn and the last is brought into position in the top of the sole mold. The injection molding apparatus injects a molten thermoplastic sole material, such as polyvinyl chloride, at high temperatures of about 300°–380° F. into the mold where the molten material bonds to the lasting margin. The lasting and the sole material then cool to complete the shoe. Once the shoe is formed, it is rapidly cooled by transferring the completed shoe from the last which was employed during the molding operation to a chilled last separate from the machine. The shoe is rapidly chilled to down below 45° F. in less than three minutes.

The steps of preheating the lasting margin of the upper prior to molding the sole, and keeping the completed shoe warm until immediately after molding whereupon the shoe is rapidly cooled, provides a secure bond of the lasting and the sole.

The heating means for preheating the string lasting margin includes a radiant heater coil attached to a supporting frame and a reflecting plate in an assembly which is, after the preheating step, retracted from its preheating position below the lasting. The heating assembly is moved into and out of its preheating position by a piston-cylinder control system. The same piston can be used to operate a pincher assembly for automatically pulling the residue of thermoplastic material, known as the "sprue", from the injection channel leading into the mold cavity.

The cooling means provided in the form of a separate last on which the formed shoe is transferred for rapid cooling helps to control the desired formation of the shoe and not permit the thermoplastic material to lose its desired shape after the injection molding step as well as reduces the time required in the injection molding cycle.

It is to be understood that while the present description refers to a mold for the sole or "sole mold", such terms are not intended to be limited to the sole and may include a mold for both a sole and a heel or a heel.

BRIEF DESCRIPTION OF THE DRAWINGS

FIGS. 7.1 and 7.2 are sectional views of the pincher assembly for removing the sprue from the sole-heel mold, taken along the line 5—5 in FIG. 1, FIG. 7.1 showing assembly extended, FIG. 7.2 showing the assembly withdrawn; and FIG. 8 is a bottom view of the lasting drawn onto the last by the string extending around the lasting margin.

BEST MODE FOR CARRYING OUT THE INVENTION

Figure 1:
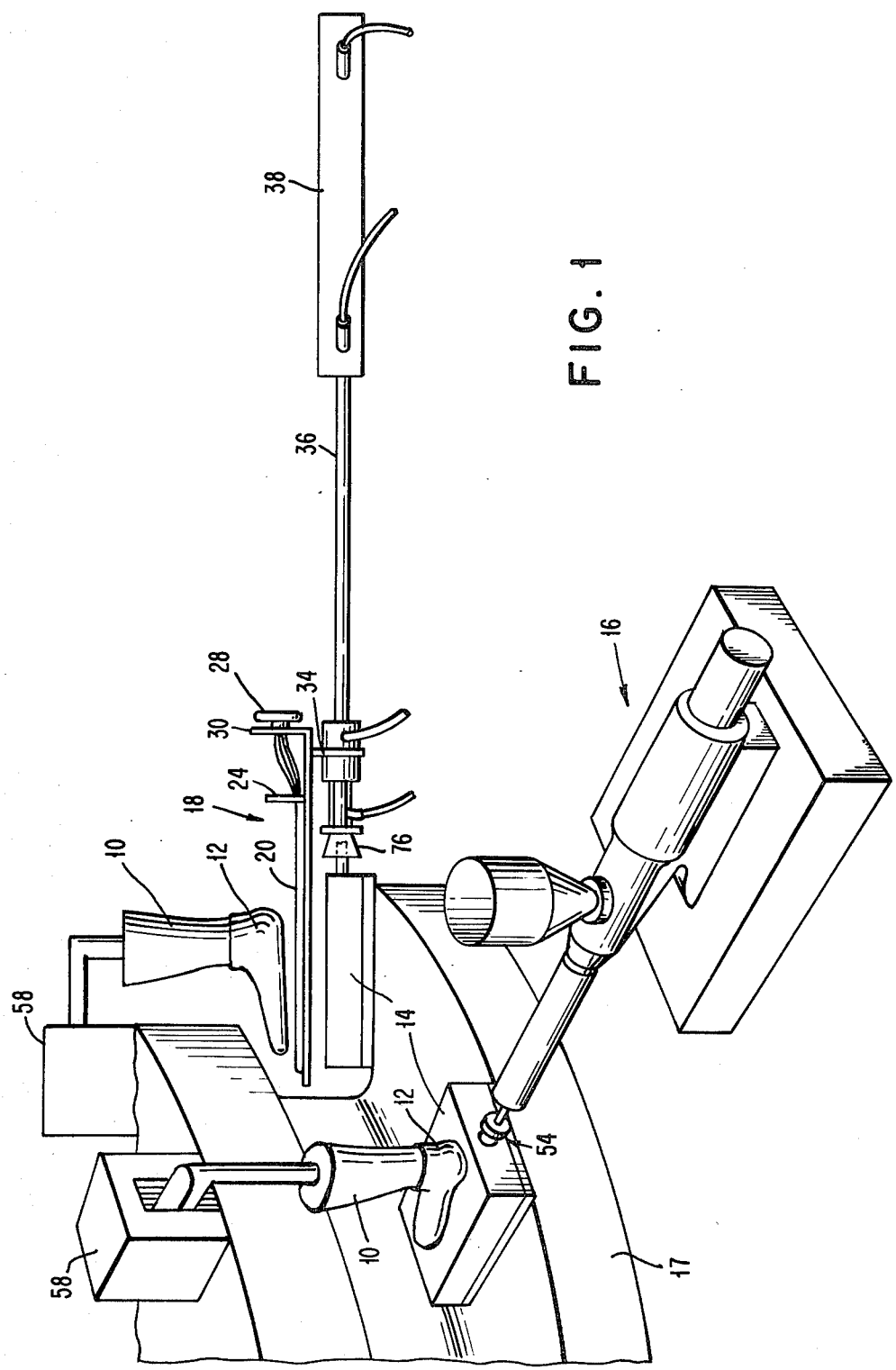
FIG. 1 is a side elevational view of the shoe making apparatus including the preheater and pincher apparatus together with a fragmentary schematic representation of an automatic shoe forming injection molding apparatus, illustrative of the present invention.

Referring now to FIG. 1 in detail, there is shown a generalized side view of the shoe making apparatus including means for pre-heating a thermoplastic lasting, preferably polyvinyl chloride (PVC), and means for automatically retracting the preheating means from the vicinity of the lasting. A last 10 holds a lasting 12 in position by the known use of a string extending around the margin of the lasting 12 and through the margin stitching, which pulls the lasting tight around the last 10. Lasting 12 may have a fabric lining, not shown, on the inside portion. The lasting margin and string are shown in FIG. 8 and will be described below. Last 10 is positioned directly above a hollow mold 14 for casting the shoe sole and heel by an injection molding apparatus 16.

Injection molding apparatus 16 can be of any suitable type, preferably of the rotary or turret type wherein a plurality of lasts are advanced on a rotatable table 17 in a step by step action through a series of stations at which various method steps of shoe formation process are performed. An example of such an apparatus is shown and described in the aforementioned U.S. Pat. No. 4,286,936 to Hustedt, the contents of which are hereby incorporated by reference.

In accordance with the present invention, the marginal edge of a string lasting, tightened onto a last, is preheated just in advance of injection of the sole-heel material into the mold cavity to improve the cohesion or adhesion between the upper and the sole-heel. This preheating is performed by a radiant heater assembly 18 shown in FIGS. 1 and 2.

The radiant heater assembly 18 includes an electric heating coil 20, such as a 1,000 watt coil, supplied with electrical current from a source of power 22. Coil 20 is held in a supporting frame 24 attached to a horizontal reflecting plate 26 which acts as a heat reflector to direct the heat from the coil 20 up toward the lasting 12. A heat regulator 28 is attached to an upright support 30 and controls the electric power and heat generated by the heater coil 20. Reflector plate 26 is also mounted on support 30 which is in turn attached to a pincher assembly 32 by means of a vertical support arm 34. Pincher assembly 32 is mounted at the end of a piston 36 which is operable by an air cylinder 38, preferably of the double acting type. The heater assembly 18 is also attached at the support plate 30 to a guide rod 40 which slideably moves with a bushing 42 rigidly supported on the cylinder 38 by a support arm 44. The heater assembly 18 may therefore be extended into and retracted from its heating position between the last 10 and the sole mold 14 by the action of piston-cylinder 36–38, and such heater assembly 18 is guided and supported by the guide rod 40 as it slides through the bushing 42.

The lasting 12 is initially shaped on the last 10 by, for example, a known drawstring pulling technique disclosed in the above noted U.S. Pat. No. 3,085,294 to F. Rosenbaum wherein a strong string is secured by means of loose stitching along the lower edge of the lasting. The string makes a substantially complete turn around on such lower edge of the lasting and the two string ends are pulled and drawn tight and tied together to hold the lasting in its desired shape. The bottom view of last 10 and a tightly drawn lasting 12 is shown in FIG. 8 wherein a string 47 extends around and is secured by loose stitching 49 around the lower edge or margin 46 of the lasting 12.

Figure 3:
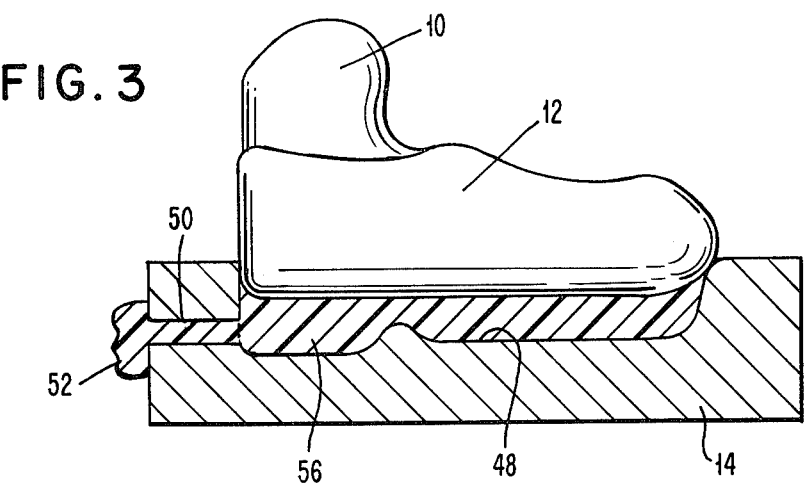
FIG. 3 is a cross-sectional view of the last and lasting set in position in a sole and heel cavity of the injection mold.

With the lasting 12 secured by the string onto last 10, the lasting margin 46 is pre-heated by the heater assembly 18 while such heater assembly 18 is positioned, as shown in FIG. 1, directly below the last 10 with piston 36 extended from its cylinder 38. The lasting margin 46 is heated to between 150° F.–200° F., preferably 180° F. until such margin becomes tacky. While the lasting margin 46 is still in a tacky condition, the last 10 and lasting margin are lowered by a positioning means 58 such that they sit in place at the top of a sole and heel mold cavity 48 formed in mold 14 as shown in FIG. 3. The rotatable table 17 positions the mold 14 in line with the injection nozzle 54 of injection casting apparatus 16 for injecting a thermoplastic compound 56, such as polyvinyl chloride, through a channel 50 in mold 14 leading into mold cavity 48 to fill such cavity. The injection material for the sole and heel is preferably polyvinyl chloride and is injected at temperatures of about 300° F.–380° F., preferably about 360° F.

Figure 4:
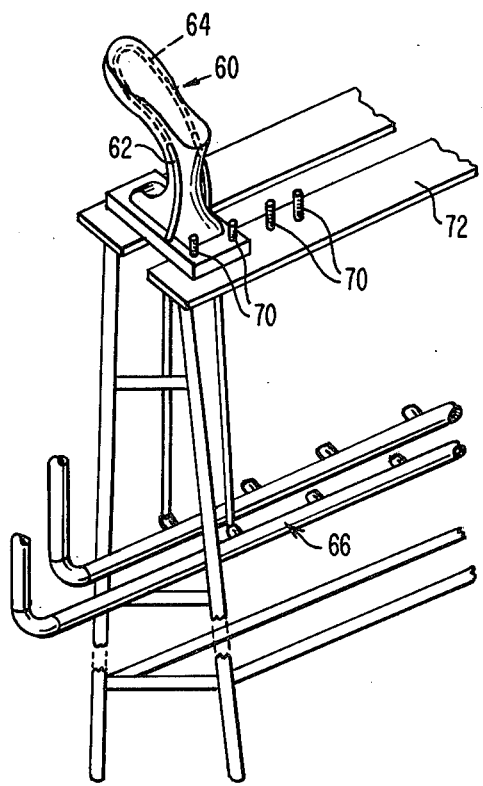
FIG. 4 is a fragmentary perspective view of the re-lasting cooling station for rapidly cooling the completed shoe.
Figure 5:
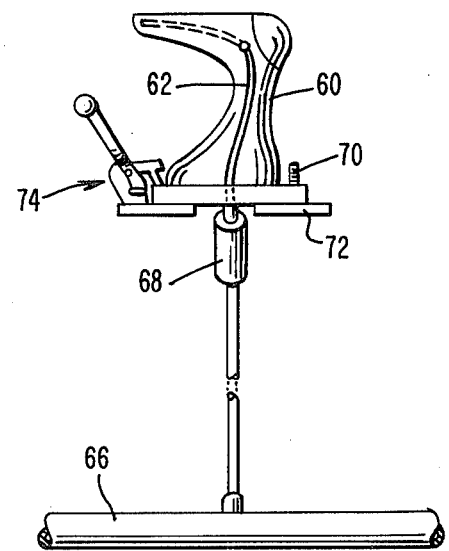
FIG. 5 is a side elevational view of a cooling last and associated apparatus.
Figure 6:
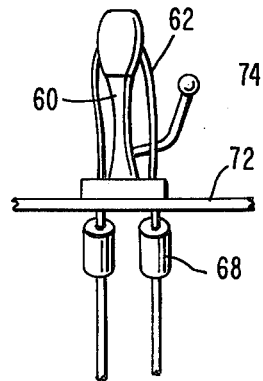
FIG. 6 is an end elevational view of the cooling last shown in FIG. 5.

After injecting the compound 56 into the sole and heel mold cavity, it is permitted to cool within the mold for a brief interval to set and then the last 12 is moved away from the mold to remove the sole and heel from the mold cavity. The completed shoe is then taken off last 12 and is rapidly cooled to below 45° F. and preferably to 20° F. in about 2½ minutes. This is accomplished by a re-lasting cooling station shown in FIGS. 4, 5 and 6 which comprise a cooling last 60 having a copper tube 62 extending around the peripheral near the sole of the last 60, as shown by the dotted lines 64. The coolant tube 62 extends out of the last 60 to where it is connected to main cooling lines 66 by means of quick disconnect couplings 68 as shown in FIG. 4.2. The last 60 is a duplicate in shape and size of the last 10 used at each station of the shoe making apparatus shown in FIG. 1. Bolts 70 are provided on a support plate 72 for supporting the coolant last 60. It is noted that the cooling station provides as many duplicate lasts 60 to each injection molding station employed in the apparatus so that the shoes can be removed from their respective molds and quickly cooled. A holding clamp 74 secures the coolant last 60 to the support plate 72 so that the coolant last can be readily interchanged with other sizes by simply releasing the holding clamp 74 and disconnecting the fuel line coupling 68.

As described above, channel 50 leads into the mold cavity 48 for receiving the nozzle 54 of the injector of molten thermoplastic material. After the injection of the thermoplastic material 56 into mold cavity 48, and after the removal of the completed shoe from the mold cavity, there is a residue 52 of the thermoplastic material, commonly called a sprue, remaining in the channel 50. Since the sprue 52 fills channel 50, it must be removed prior to the next injection molding operation in the sole-heel mold 14. Heretofor, this has been done manually at great labor cost. Also manual removal of sprues has always led to a loss of substantial amounts of material, which is costly. The automatic removal of the sprue 52 overcomes both these shortcomings. It is accomplished by the apparatus in a manner which will be described together with the operation of the heater assembly 18.

Thus, when the formed shoe is removed from the mold 14, it is torn from the sprue 52 which is retained in the channel 50 of mold 14 as well as extending outside of channel 50 as shown in FIGS. 7.1 and 7.2. FIG. 7.1 shows a top view of the pincher assembly 32 and the mold 14 at the part where the sprue 52 is being grasped by fingers 76 of the pincher assembly 32. FIG. 7.2 shows the mold 14 after the sprue 52 has been pulled out of channel 50 by the pincher assembly 32 when the piston 36 has been retracted. Here, the fingers 76 open to release the sprue 52, always at the same location, so that it may fall into a receptable, not shown, and be recovered for reprocessing.

Figure 2:
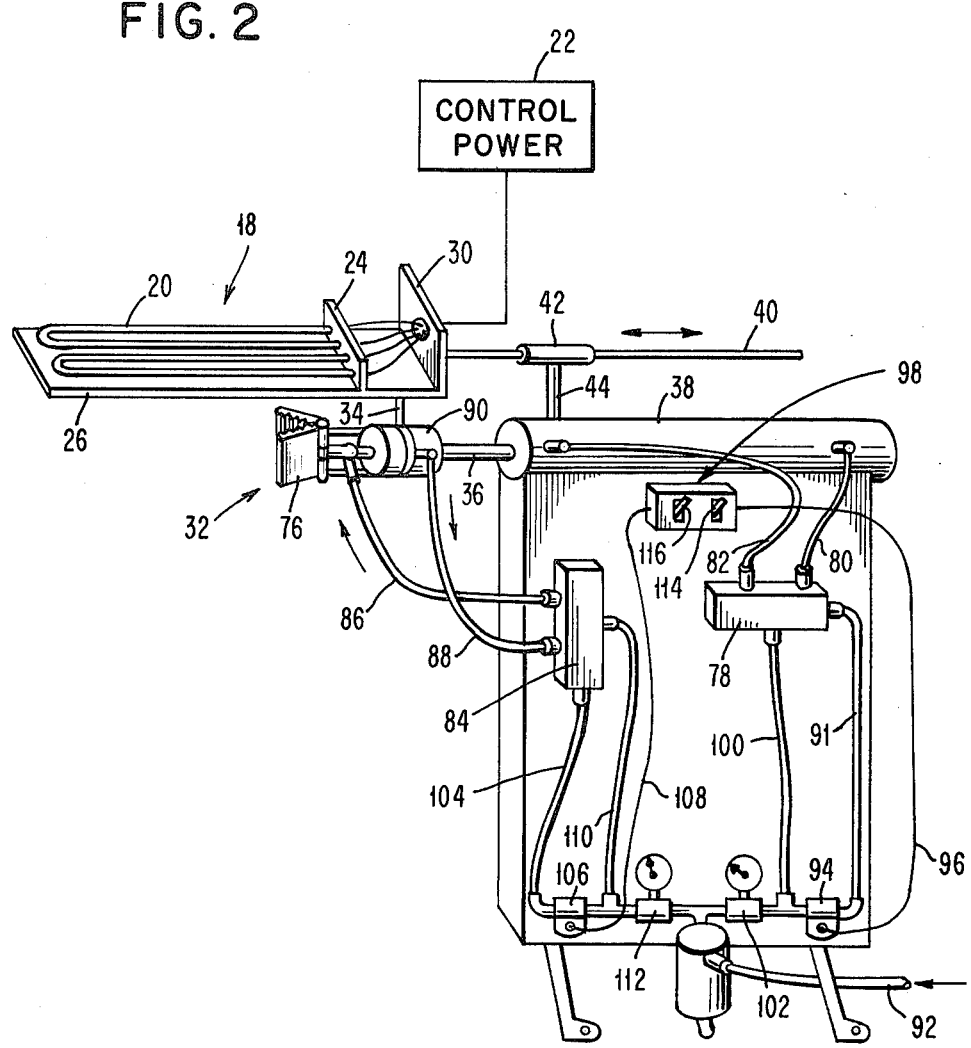
FIG. 2 is a perspective view of the preheater and pincher and schematically shows details of the control system for operating the preheater and pincher apparatus shown in FIG. 1.

The apparatus for controlling the operation and movement of the heater assembly 18 as well as the pincher assembly 32 will now be described with respect to the FIGS. 1 and 2. The sprue 52 must be removed from mold 14 prior to each injection operation into the mold cavity 14 in order to ensure that the channel 50 is clear. A desirable manner of accomplishing this is to automatically pull the sprue 52 at the same time that the heater assembly 18 is being retracted by piston 36 immediately after heater assembly 18 has heated the string lasting margin 46 as described above. A spring loaded air valve 78 has its forward pressure line 80 and its reaction line 82 connected to cylinder 38 for operating the same. A similar three-way air valve 84 has its lines 86 and 88 connected to the respective open and closed chambers of a cylinder 90 of the pincher assembly 32 for causing the fingers 76 to open and close onto the sprue 52 in response thereto. Air valve 78 is connected via line 91 to a source 92 of air supply. A coil-solenoid valve 94 is activated by electrical line 96 from a control box 98 which causes the solenoid valve 94 to open or close and thereby operate the three-way air valve 78 to cause extension or retraction of the piston 36 of cylinder 38. A return line 100 is connected between the air valve 78 and the line to the air supply 92. A pressure regulator 102 is also connected in the supply line as shown.

Similarly, the pincher assembly 32 has its three-way air valve 84 connected to the air supply 92 by means of valve inlet line 104 and a relay coil-solenoid valve 106. Valve 106 is energized to operate by means of current supplied on electrical line 108 from the control box 98. A return line 110 is provided between the air valve 84 and the supply line. Also, an air pressure regulator 112 is provided for controlling the pressure, preferably in the range of 60–80 p.s.i., in the air lines to the pincher assembly 32. Air pressure regulator 102 is set to about 40 p.s.i. for controlling the pressure to the cylinder 38.

In operation, a lever 114 on control box 98 can be moved into position to cause the piston 36 to be extended by applying current through electric line 96 to operate the solenoid valve 94 to cause a regulated supply of air to pass through the valve 78 and line 80 to the cylinder 38. This causes the feeder assembly 18 and pincher assembly 32 to be moved forward into their operative positions as shown in FIG. 1. In this position, electrical current for heating the resistance elements 20 of the heater assembly 18 is provided from the source of power 22. In this connection, it is noted that the source of power 22 can be controlled by a computer operated timing means for the system or other suitable control means, not shown. The lasting margin 46 of the last 12 is heated until it becomes tacky, preferably at about 150° F.–200° F. after which the power to the heating element 20 is turned off. If it is desired to remove the sprue 52 from the mold 14 at this point in the manufacturing operation, a lever 116 in control box 98 is pushed to energize the solenoid valve 106 to cause air valve 84 to provide sufficient pressure in line 88 for closing the pincher fingers 76 onto the sprue 52 as shown in more detail in FIG. 7.1. Timing means, not shown in the control box 98, will release the electrical signal to solenoid valve 106 which thereby causes the air valve 84 to provide a supply of air on line 86 for opening the pincher assembly. This is a timed action in that the fingers 78 will release and drop the sprue 52 at the same location, for recovery for processing, as the piston 36 is retracting as shown in FIG. 7.2.

Cylinder 38 is controlled to push the piston forward at the same time when the injection gun of the injection casting apparatus 16 is moving forward into position adjacent the mold 14. After the mold cavity 48 is filled, the holding timer for the fingers is activated to energize the coil of solenoid valve 106 for closing the fingers 76 onto the sprue 52. Sprue 52 is pulled away from the mold after the injection gun is withdrawn, which in turn activates the cylinder 38 to return to position.

It should be understood that the embodiment of the invention described herein is intended to be illustrative of the invention and that various changes can be made to such embodiment without departing from the spirit and scope of the invention.

What is claimed is:

1. Apparatus for making shoes of the type comprising an injection molded sole which is bonded to a marginal edge portion of a string lasting made of a thermoplastic material, comprising:

a first last for holding said lasting;

a sole mold having a cavity for receiving a molten thermoplastic material for forming said sole, said sole mold being adaptable to be closed at its top by said first last;

means for preheating the lower surface of said marginal edge portion of said lasting until it is in a tacky condition;

means for positioning said preheated lasting and said first last at said top of said sole mold;

means for injecting a molten thermoplastic material into said cavity of said sole mold whereby said molten material bonds to said marginal edge portion of said lasting to form a completed shoe, and a cooling last comprising a second last for mounting and holding said completed shoe thereon after said shoe is removed for said first last, said cooling last having means for rapidly cooling said completed shoe to a temperature substantially below room temperature; whereby a secure bonding of said lasting with said injection molded sole is provided as well as maintaining the desired shape of the completed shoe, said means for preheating said marginal edge portion of said lasting including radiant heater element means, a reflecting wall supported at one side of said heater element means for reflecting heat toward said lasting, and means for positioning said heater element means and reflecting wall adjacent said lasting for preheating thereof, and means for retracting said heater element means and reflecting wall from the preheating position, after heating said marginal edge portion of said lasting, to a retracted position away from said lasting.

2. Apparatus as recited in claim 1, wherein said heater element means includes means for controlling the temperature of said heater element means.

3. Apparatus as recited in claim 1, further comprising control means for controlling the positioning of said heater element from its extended heating position below said marginal edge portion of said lasting to a retracted position away from said lasting.

4. Apparatus as recited in claim 1, wherein said thermoplastic material of said lasting is polyvinyl chloride.

5. Apparatus as recited in claim 1, wherein said thermoplastic material injected into the cavity of said sole mold is polyvinyl chloride.

6. Apparatus as recited in claim 1, wherein said preheating means is adapted for heating said string lasting margin to a temperature in the range of 300°–380° F.

7. Apparatus as recited in claim 1, wherein said cavity in said sole mold is adapted for forming both a heel and a sole with said injected thermoplastic material.

8. Apparatus as recited in claim 1, wherein said cooling last comprises said second last having cooling means therein, said cooling last being adapted to receive the hot completed shoe thereon, whereby said cooling means rapidly cools said completed shoe.

9. Apparatus as recited in claim 8, wherein said cooling means in said cooling last comprises coolant passages in communication with a fluid coolant supply.

10. Apparatus as recited in claim 8, wherein said cooling means are adapted to rapidly cool said shoe to below 45° F. in less than 3 minutes.

11. Apparatus a recited in claim 8, wherein said cooling last has the same shape and size as said first last used for forming said completed shoe prior to cooling on said separate cooling last.

12. Apparatus as recited in claim 1, further comprising means for automatically removing the sprue formed of the residue of thermoplastic material remaining in an injection channel in said sole mold, including a pincher assembly having finger means for grasping said sprue and pulling said sprue out of said injection channel.

13. Apparatus as recited in claim 12, wherein said means for removing said sprue further comprises means for extending said pincher assembly to a position adjacent said sole mold where said pincher fingers can grasp said sprue, and means for retracting said pincher assembly to a position away from said sole mold whereby said sprue is pulled out of said injection channel.

14. Apparatus as recited in claim 13, wherein said means for extending and retracting said pincher assembly include cylinder and piston means connected to said pincher assembly, and control means for operating said cylinder and piston means to extend or retract said pincher assembly.

15. Apparatus as recited in claim 14, wherein said piston means of said cylinder for extending and retracting said pincher assembly is also operatively connected to said preheating means for extending said preheating means into operative position below said marginal edge portion of said lasting during the preheating operation and retracting said preheating means after said preheating operation, whereby retraction of said preheating means and removal of said sprue can be simultaneously carried out in one operation of said cylinder.

16. Apparatus for making shoes of the type comprising an injection molded sole which is bonded to a marginal edge portion of a string lasting made of a thermoplastic material, comprising:

a last for holding said lasting;

a sole mold having a cavity for receiving a molten thermoplastic material for forming said sole, said sole mold being disposed so as to be closed at its top by said last;

means for preheating a lower surface of said marginal edge portion of said lasting until it is in a tacky condition, said means for preheating including heater element means, means for positioning said heater element means adjacent said lasting near said marginal edge portion for preheating thereof, and means for retracting said heater element means from said preheating position after said marginal edge portion of said lasting is heated to the desired temperature;

means for positioning said preheated lasting and said last at said top of said sole mold; and means for injecting a molten thermoplastic material into said cavity of said sole mold whereby said molten material bonds to said marginal edge portion of said lasting to form a completed shoe;

whereby a secure bonding of said lasting with said injection molded sole is provided.

17. Apparatus as recited in claim 16, wherein said heater element means comprises a radiant heater, and further comprising a reflecting wall supported at one side of said radiant heater for reflecting heat toward said lasting.

18. Apparatus as recited in claim 16, wherein said heater element means includes means for controlling the temperature of said heater element means.

19. Apparatus as recited in claim 16, further comprising control means for controlling the positioning of said heater element means from an extended heating position adjacent said marginal edge portion of said lasting to a retracted position away from said lasting.

20. Apparatus as recited in claim 16, further comprising means for automatically removing the sprue formed of the residue of thermoplastic material remaining in an injection channel in said sole mold, including a pincher assembly having finger means for grasping said sprue and pulling said sprue out of said injection channel.

21. Apparatus as recited in claim 20, wherein said means for removing said sprue further comprises means for extending said pincher assembly to a position adjacent said sole mold where said pincher fingers can grasp said sprue, and means for retracting said pincher assembly to a position away from said sole mold whereby said sprue is pulled out of said injection channel.

22. Apparatus as recited in claim 21, wherein said means for extending and retracting said pincher assembly include cylinder and piston means connected to said pincher assembly, and control means for operating said cylinder and piston means to extend or retract said pincher assembly.

23. Apparatus as recited in claim 23, wherein said piston means of said cylinder for extending and retracting said pincher assembly is also operatively connected to said preheating means for extending said preheating means into operative position adjacent said marginal edge portion of said lasting during the preheating operation and retracting said preheating means after said preheating operation, whereby retraction of said preheating means and removal of said sprue can be simultaneously carried out in one operation of said cylinder.

24. In an injection molding apparatus for the manufacture of shoes of the type comprising a string lasting bonded to an injection molded sole, said apparatus comprising a rotatable table, a plurality of mold assemblies mounted on said table, each of said mold assemblies having a cavity for receiving a molten thermoplastic material for forming a shoe bottom, an injection channel in each mold assembly leading into said mold cavity, injection means for injecting a molten thermoplastic material into said cavity of said mold assembly, means for locating said table for successively aligning said injection channel of each mold assembly with an outlet of said injection means for injecting said molten thermoplastic material into said cavity, means for preheating said lasting and means for removing the shoe bottom from said cavity after said material has set, the improvment of which comprises means located at the position adjacent said rotatable table for automatically removing a sprue formed of the residue of thermoplastic material remaining in said injection channel in said mold assembly after removal of said shoe bottom formed in said cavity, said automatic sprue removal means operatively connected to said preheating means, said automatic sprue removal means including a pincher assembly having finger means for grasping said sprue, means for extending said pincher assembly to a position adjacent said mold assembly when said mold assembly on said table is adjacent to said pincher assembly, control means for activating said finger means for grasping said sprue, and means for retracting said pincher assembly to a position away from said mold assembly whereby said sprue is pulled out of said injection channel, said preheating means being removable by said retracting means.

25. Apparatus as recited in claim 24, wherein said means for extending and retracting said pincher assembly include cylinder and piston means connected to said pincher assembly, and control means responsive to the position of said mold assembly in said rotatable table for operating said cylinder and pistion means to extend or retract said pincher assembly.

26. Apparatus as recited in claim 24, wherein said control means includes means for automatically causing said pincher fingers to open and release said pulled sprue for deposit into a predetermined collection area.

* * * * *